Patented July 25, 1950

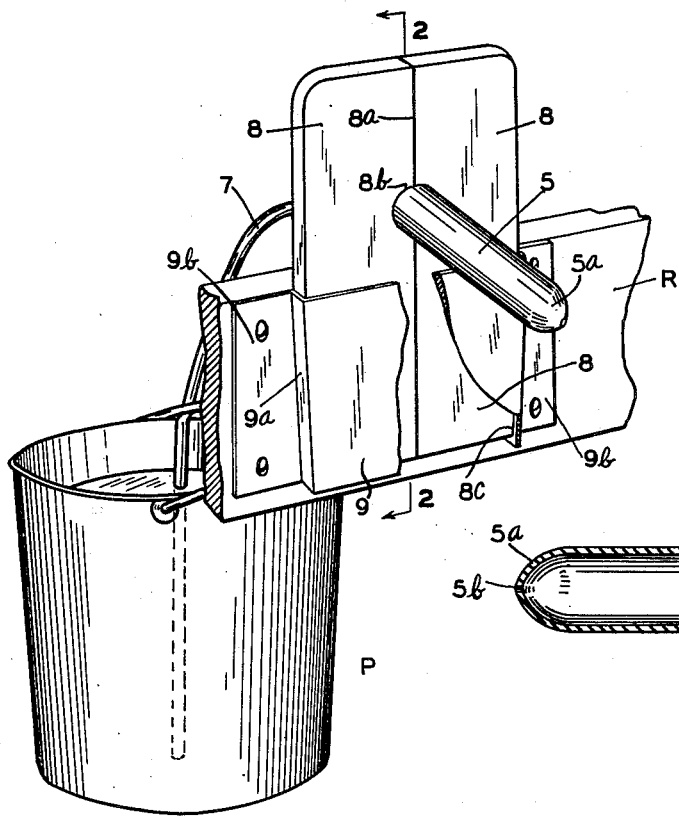
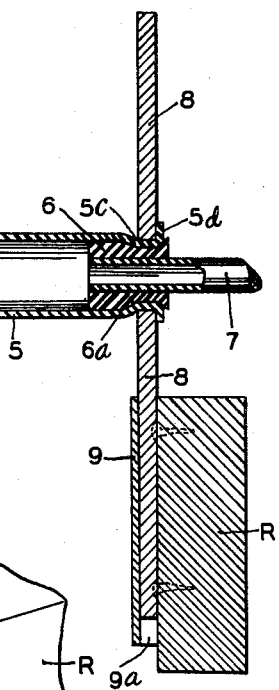
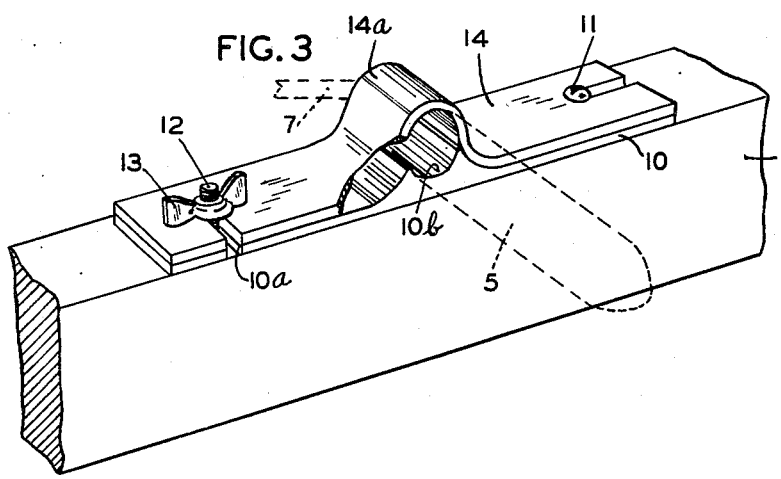

2,516,730

UNITED STATES PATENT OFFICE 2,516,730

SUCKLING DEVICE FOR CALVES

Paul O. Stevens, Minneapolis, Minn., assignor to Mutual Products Company, Minneapolis, Minn., a partnership Application March 20, 1946, Serial No. 655,710

2 Claims. (Cl. 119—71)

This invention relates to devices for feeding suckling calves and other young animals and particularly to devices adapted for use on farms and in dairies for enabling a young animal to feed from a pail or other container. At the present time dairymen find it profitable to feed young calves large quantities of prepared food mixtures containing skim milk in solid or liquid form supplemented with other ingredients essential to the diet. It has been found advantageous to feed the calf independently of the mother as early as possible after birth in order that the mother's milk may be made available for cream and butter for human consumption.

Suckling feeding pails and some other suckling devices have been heretofore utilized, but for several reasons the same have not been widely accepted. One disadvantage of prior art devices has been the difficulty in sterilizing the several parts of the suckling device and its connection with a container in accordance with health requirements and law. Another objection has been leakage and waste occasioned by such devices during use thereof as well as when standing. Most of such devices have been rather complicated and have often required valves and other inside parts and connections which were expensive and which furthermore were difficult to sterilize.

It is an object of my present invention to provide a very simplified but highly efficient suckling feeder for calves and the like which is independent and not mechanically connectable with a container or pail; which includes a minimum number of parts readily detachable for cleaning and sterilization and which may be readily and very quickly installed for use.

Another object is the provision of a simplified suckling feeder which consists primarily in a nipple or rubber tit, a tube for connection thereof with the contents of a container, and a mounting and clamping means for said nipple to position the same properly for feeding and to reinforce the same and its connection with said tube.

A still further object is the provision of a very compact suckling mechanism which may be packaged for shipment in a small bundle and which, for its connection to a pail containing liquid food, relies merely upon immersion of the end of a flexible conduit in the contents of the pail.

These and other objects and advantages of the invention will more fully appear from the following description made in connection with the accompanying drawings wherein like reference characters refer to the same or similar parts throughout the various views, and in which Fig. 1 is a perspective view showing an embodiment of my invention connected for feeding.

Fig. 2 is a vertical section taken on the line 2—2 of Fig. 1; and

Fig. 3 is a perspective view with a part broken away showing a somewhat different form of retaining clamp for the nipple.

In the form of my invention shown in Figs. 1 and 2 I provide an elongated, flexible nipple 5 having a round tip 5a provided with an axial, preferably circular, liquid orifice 5b and constructed preferably from an elastic as well as flexible material, such as natural or synthetic rubber. The nipple 5 is preferably preformed at its open or inner end to be of diminished diameter as compared to the body thereof, forming a plug attachment collar 5c terminating in a marginal out-turned flange 5d. The plug attachment collar 5c is adapted to be expanded to tightly fit the reduced attachment portion 6a of a generally cylindrical plug 6 which may be constructed from gum rubber or other suitable material having some compressibility but being substantially stiff and rigid.

A flexible tube 7 internally fits plug 6 at its outer end and is vulcanized or otherwise rigidly connected with the interior of said plug and extends axially therethrough. Tube 7 may also be constructed of flexible rubber and is of a suitable length to extend from a mounting bracket to a pail or other container and to the bottom of such pail when the suckling mechanism is operatively positioned for feeding.

I provide a suitable clamping mechanism which has the dual function of mounting the nipple 5 for feeding as well as reinforcing, making positive the connection of the nipple 5 with plug 6 and conduit 7. Thus as shown in Figs. 1 and 2, cooperating clamping elements in the form of vertical plates 8 are associated with a downwardly tapered attachment bracket 9 to engage and clamp against the attachment collar of the nipple and the plug 6. Plates 8, as shown, have opposed straight vertical edges 8a recessed semi-circularly at their medial portions 8b for embracing in cooperation the plug attachment collar of the nipple. The outer longitudinal and vertical edges of plates 8 at their lower portions 8c are declined somewhat from the vertical, being tapered downwardly to form wedging surfaces. These surfaces cooperate with slightly inclined longitudinal edges 9a of the attachment bracket 9, whereby, when the plates 8 with a nipple 6 inserted between the opposed recessed portions 8b are forced downwardly in the holder of bracket 9, the plates will be forced slightly together tightly clamping against the collar 5c of the nipple and against the somewhat compressible plug member 6 disposed therein.

The attachment bracket 9 may conveniently constitute a metal plate having attachment feet 9b disposed in a common plane for convenient attachment by screws or nails to a vertical rail R. The bracket is inclined at the medial shallow U-shaped portion (in cross section) which is offset outwardly from attachment feet 9b and which serves in combination with the adjacent vertical side of the rail to form a socket for holding the lower portions of the clamping plates 8.

In Fig. 3 a somewhat different type of quickly applied clamping mechanism is illustrated, also serving the dual purpose of mounting or positioning the nipple for feeding and serving to reinforce and make positive the connection between the nipple and its associated plug connection with the flexible supply hose. In Fig. 3 a quickly detachable horizontal base plate 10 is provided having, as shown, pin and slot connections with an upstanding screw 11 extending vertically from the top of a rail R, while at the opposite end, connection of plate 10 is made by means of a laterally extending slot 10a with a wing bolt 12 having a threaded wing nut 13 removably connected therewith. A second clamping plate 14 of preferably similar length and width to clamping plate 10 is superimposed thereon having a common means of connecting at its ends with the rail R. The upper plate 14 at its medial portion is upwardly or outwardly curved to form a semicylindrical clamping element 14a which is opposed to a partially cylindrical clamping surface 10b formed in the medial portion of the clamping plate 10.

A feeding nipple 5 is indicated in dotted lines in Fig. 3 having its attachment collar with the plug therein, clamped between the opposing clamping surfaces 14a and 10b of the said clamping device.

*Operation*

In use, the open or skirt end of the nipple 5 is detachably secured to the plug member 6 which has affixed thereto, the flexible tube 7. The plug attachment collar of the nipple with the plug therein, is then positioned between the opposed semi-circular recessed portions 8b of the clamping plates 8 and the plates with the nipple therein, are inserted in the socket or pocket of the attachment bracket, the downward thrust of plates 8 in the bracket forcing the clamping edges of the plate together and thereby securely positioning the nipple with reference to the plates as well as reinforcing and securing the joint between the nipple 5 and the diminished medial portion of the plug member 6. The conduit and tube 7 extends inwardly of plates 8 and the supporting rail and the lower end of the tube is immersed in the liquid content of a container P which may also be supported from rail R. The nipple preferably is retained against displacement by insertion beneath the bail or some guide member on the pail or container and is extended so that the extremity thereof is in close relation to the bottom of the container.

With my device or apparatus so mounted, it will be noted that the nipple 5 is considerably above the level of the liquid contents of the container and the calf or other young animal in feeding, must suck the liquid upwardly before he can swallow the food. In actual tests, it has been found that a suckling calf exerts more than adequate suction to lift a column of milk well over three feet, through a conduit or hose of approximately a half inch internal diameter.

With my improved structure, the parts may be very quickly disconnected for cleaning and sterilization. The nipple is unclamped from the support by merely lifting the plates 8 upwardly or in the case of the form shown, in Fig. 3, swinging the upper plate 14 outwardly to disengage its connection with the wing nut. Thereafter, the nipple may be readily slipped from its engagement with plug 6 and the nipple tube and plates may be rinsed and then dipped into a container having a liquid sterilizing fluid therein. It will be noted that no valves, screw threaded connections or interior working parts are utilized in my improved construction. Connection and assembly as well as quick and thorough sterilization are therefore greatly improved over the prior art devices.

It will of course, be understood that various changes may be made in the form, details, arrangement and proportions of the parts without departing from the scope of my invention.

It should be understood that the elastic nipple 5 need not be preformed or diminished at its open, attachment end. It may be cylindrical at the skirt portion 5c and may fit very loosely, a cylindrical, compressible plug member 6. In such instance, when the clamping plates 8 are operatively applied, the plug member 6 will be compressed, as shown in Fig. 2, and the skirt of the nipple very securely clamped thereto. Figures 1 and 2 illustrate both the preformed attachment collar of the skirt, as well as the cylindrical nipple and cylindrical plug when the parts are clamped in position for use.

What I claim is:

1. Suckling mechanism comprising as essential elements only, an elongated flexible nipple having an elastic, open attachment end, a generally cylindrical plug member constructed of somewhat compressible solid material and detachably fitting the open end of said nipple and distending the same and having a flow passage therethrough, a supply conduit secured to said plug member, a pair of upstanding, cooperating clamping plates having opposed, straight longitudinal edges provided with aligned, cooperating, recessed, semi circular nipple-clamping portions in the upper parts of said plates and an upstanding, supporting and clamp-producing socket having an open upper end for receiving the lower ends of said plates when the same are transversely aligned in vertical position with the attachment end of said nipple distended by said plug circumferentially engaged by said semi circular, cooperating nipple-clamping portions, said socket having downwardly tapered, opposed side walls and said plates having their outer longitudinal edges correspondingly tapered downwardly from the medial portions thereof to produce an inward, transverse wedging action upon said plates when the same are downwardly thrust into said socket whereby said nipple is tightly clamped against said plug and whereby said plug and nipple are supported and secured in substanitally perpendicular relation to said upstanding plates and in a position above said socket.

2. The structure set forth in claim 1 wherein said supply conduit is telescopically connected with said compressible plug whereby clamping pressure applied circumferentially by said plates to the attachment end of said nipple distended by said plug, is transmitted to said conduit.

PAUL O. STEVENS.

REFERENCES CITED

The following references are of record in the file of this patent:

UNITED STATES PATENTS

| Number | Name | Date |
|---|---|---|
| 231,329 | Kelch | Aug. 17, 1880 |
| 886,485 | Espy | May 5, 1908 |
| 984,923 | Jacobson et al. | Feb. 21, 1911 |
| 1,002,426 | Moore | Sept. 5, 1911 |
| 1,127,797 | Moore | Feb. 9, 1915 |
| 2,419,183 | Womack | Apr. 15, 1947 |